US012804692B2

(12) United States Patent
Yao et al.

(10) Patent No.: US 12,804,692 B2
(45) Date of Patent: Nov. 17, 2026

(54) SYSTEMS, METHODS, AND NON-TRANSITORY PROCESSOR-READABLE MEDIA FOR MODE SWITCHING IN WIRELESS COMMUNICATION NETWORKS

(71) Applicant: ZTE CORPORATION, Shenzhen (CN)

(72) Inventors: Ke Yao, Shenzhen (CN); Bo Gao, Shenzhen (CN); Shujuan Zhang, Shenzhen (CN); Yang Zhang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 332 days.

(21) Appl. No.: 18/533,329

(22) Filed: Dec. 8, 2023

(65) Prior Publication Data

US 2024/0107563 A1 Mar. 28, 2024

Related U.S. Application Data

(63) Continuation of application No. PCT/CN2022/070292, filed on Jan. 5, 2022.

(51) Int. Cl.

| | |
|---|---|
| ***H04W 72/51*** | (2023.01) |
| ***H04W 72/044*** | (2023.01) |
| ***H04W 88/06*** | (2009.01) |

(52) U.S. Cl.
CPC ......... *H04W 72/51* (2023.01); *H04W 72/046* (2013.01); *H04W 88/06* (2013.01)

(58) Field of Classification Search
CPC ... H04W 72/51; H04W 72/046; H04W 88/06; H04W 72/1268; H04B 7/06956
See application file for complete search history.

(56) References Cited

U.S. PATENT DOCUMENTS

| | | | | |
|---|---|---|---|---|
| 2018/0048375 A1* | 2/2018 | Guo | ..................... | H04B 7/0696 |
| 2019/0223033 A1* | 7/2019 | Nam | ..................... | H04B 7/0404 |
| 2021/0167821 A1 | 6/2021 | Chen et al. | | |
| 2022/0116981 A1* | 4/2022 | Saber | ......................... | H04L 1/08 |
| 2022/0239440 A1 | 7/2022 | Go et al. | | |

FOREIGN PATENT DOCUMENTS

| | | | | |
|---|---|---|---|---|
| CN | 111183593 A | | 5/2020 | |
| KR | 20230117349 A | * | 8/2023 | ......... H04B 7/06952 |
| WO | WO-2020/246819 A1 | | 12/2020 | |

(Continued)

OTHER PUBLICATIONS

AT&T, "Remaining Issues on Enhancements for Multi-Beam Operations", 3GPP TSG RAN WG1 #107e, R1-2111803, e-Meeting, Nov. 11, 2021 (6 pages).

(Continued)

*Primary Examiner* — Ayanah S George
(74) *Attorney, Agent, or Firm* — Foley & Lardner LLP

(57) ABSTRACT

A wireless communication method includes determining, by a wireless communication device, at least one mode. Each of the at least one mode corresponds to at least one beam state. The wireless communication device determines an uplink transmission according to at least one of the at least one beam state or the at least one mode.

19 Claims, 5 Drawing Sheets

(56) References Cited

FOREIGN PATENT DOCUMENTS

WO WO-2021/212468 A1 10/2021
WO WO-2022056480 A1 * 3/2022 ........... H04L 5/0023

OTHER PUBLICATIONS

CMCC, "Enhancements on multi-beam operation", 3GPP TSG RAN WG1 #107-e, R1-2111597, e-Meeting, Nov. 11, 2021 (7 pages).
Fgi et al., "Discussion of enhancements on multi-beam operation" 3GPP TSG RAN WG1 #106-e, R1-2107297, e-Meeting, Aug. 16, 2021 (10 pages).
Huawei, et al., "Enhancements on multi-beam operation in Rel-17", 3GPP TSG RAN WG1 Meeting #107-e, R1-2110781, e-Meeting, Nov. 11, 2021 (5 pages).
International Search Report and Written Opinion for PCT Appl. No. PCT/CN2022/070292, mailed on Sep. 26, 2022 (6 pages).
ZTE, "Enhancements on Multi-beam Operation", 3GPP TSG RAN WG1 Meeting #107-e, R1-2110948, Nov. 19, 2021, e-Meeting (20 pages).
Extended European Search Report for EP Appl. No. 22917727.4, dated Jul. 18, 2024 (9 pages).

* cited by examiner

400

| Downlink RS Indicator | L1-RSRP/SINR | Mode Indicator |
|---|---|---|
| SSBRI/CRI #1 | X1 | Mode 1 |
| SSBRI/CRI #2 | X2 | Mode 1 |
| SSBRI/CRI #3 | X3 | none |

SYSTEMS, METHODS, AND NON-TRANSITORY PROCESSOR-READABLE MEDIA FOR MODE SWITCHING IN WIRELESS COMMUNICATION NETWORKS

CROSS-REFERENCE TO RELATED APPLICATION

This application claims the benefit of priority under 35 U.S.C. § 120 as a continuation of International Patent Application No. PCT/CN2022/070292, filed on Jan. 5, 2022, the disclosure of which is incorporated herein by reference in its entirety.

TECHNICAL FIELD

The disclosure relates generally to wireless communications and, more particularly, to systems, methods, and non-transitory processor-readable media for panel mode switching in wireless communication networks.

BACKGROUND

In New Radio (NR) technology of Fifth Generation (5G) mobile communication systems, high-frequency bands are supported. Although high-frequency bands have abundant frequency domain resources, wireless signals in high-frequency bands decay quickly, and coverage of the high-frequency wireless signals is reduced. Thus, transmitting signals in a beam mode allows energy to be concentrated in a relatively small spatial range to improve the coverage of the wireless signals in high-frequency bands.

SUMMARY

In some arrangements, systems, methods, apparatuses, and non-transitory computer-readable media allow determining, by a wireless communication device, at least one mode. Each of the at least one mode corresponds to at least one beam state. The wireless communication device determines an uplink transmission according to at least one of the at least one beam state or the at least one mode.

In some arrangements, systems, methods, apparatuses, and non-transitory computer-readable media allow sending, by a network to a wireless communication device, at least one mode. Each of the at least one mode corresponds to at least one beam state. The network receives from the wireless communication device an uplink transmission according to the at least one mode or the at least one beam state.

In some arrangements, systems, methods, apparatuses, and non-transitory computer-readable media allow determining, by a wireless communication device, a precoder for a Physical Uplink Shared Channel (PUSCH) transmission according to a Sounding Reference Signal (SRS), determining, by the wireless communication device, a power control parameter for the PUSCH transmission according to a Reference Signal (RS) of the SRS, and transmitting, by the wireless communication device to a network, the PUSCH according to the power control parameter.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
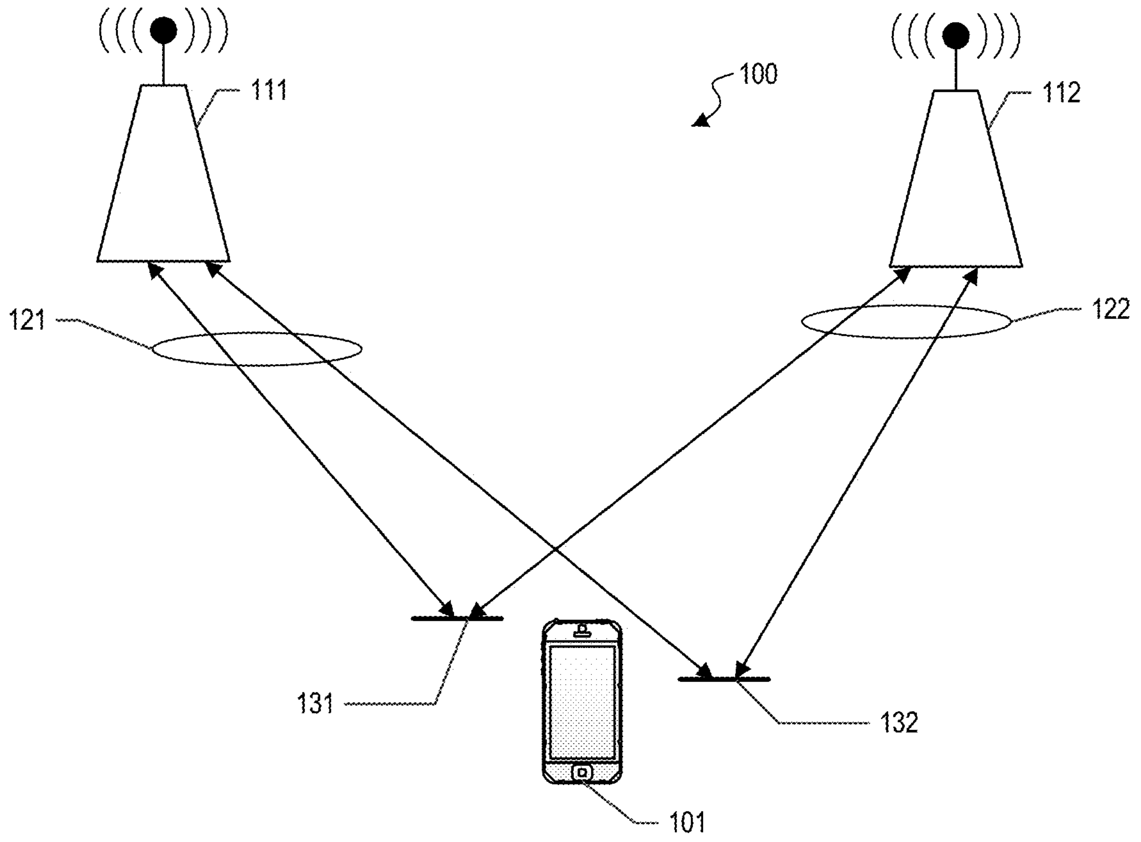
FIG. 1 is a diagram illustrating an example communication system including a User Equipment (UE) and base stations, according to various arrangements.

FIG. 1 is a diagram illustrating an example communication system 100 including a UE 101 and base stations 111 and 112, according to various arrangements. In some implementations, the UE 101 can be configured with multiple (antenna) panels, such as the panels 131 and 132. Multiple panels can be used to transmit a uplink signal, e.g. Physical Uplink Control Channel (PUCCH), Physical Uplink Shared Channel (PUSCH), Sounding Reference Signal (SRS), or Physical Random Access Channel (PRACH). Panels of the UE 101 can have same or different capabilities.

A base station (e.g., the base station 111 or the base station 112) can configure at least one SRS resource set to the UE with usage of (to be applied to at least one of Beam Management (BM), Antenna Switching (AS), Codebook (CB, for codebook-based PUSCH transmission), non-codebook (NCB, for non-codebook based PUSCH transmission).

In some arrangements, an SRS resource set can correspond to a panel, e.g. on UE side, with the usage of BM. For example, a first SRS resource set corresponds and can be applied to the panel 131, and a second SRS resource set corresponds and can be applied to the panel 132. In some arrangements, an SRS resource set can correspond to a base station (e.g., a TRP) with the usage of CB or NCB. As shown in FIG. 1, the SRS resource set 121 corresponds to the base station 111, and the SRS resource set 122 corresponds to the base station 112. An SRS resource set includes at least one SRS resource. Each SRS resource corresponds to one panel. The SRS resources in an SRS resource set can correspond to one or more panels.

In the examples in which there are two or more SRS resources in an SRS resource set, the SRS resources in the SRS resource set can be configured or used to determine a spatial relation, with different number of (SRS) ports. In the examples shown in FIG. 1, there are 4 SRS resources in either of the SRS resource set 121 or 122, where 2 of the SRS resources corresponds to and are used for the panel 131, and the other 2 of the SRS resources correspond to and are used for the panel 132.

Currently, a UE cannot determine panel activation, especially when switching between a single panel to a panel combination. Such switching can enable the UE to save power.

Figure 2:
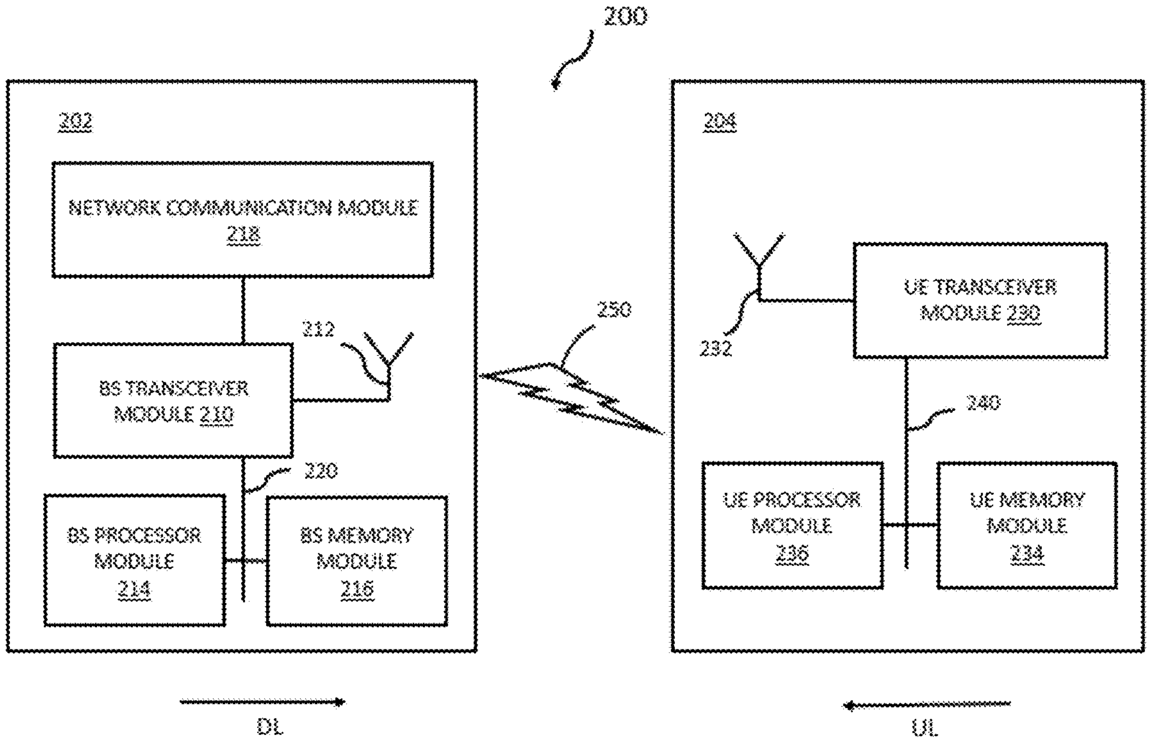
FIG. 2 illustrates block diagrams of an example base station and an example user equipment device, according to various arrangements.

FIG. 2 illustrates a block diagram of an example wireless communication system 200 for transmitting and receiving wireless communication signals, e.g., OFDM/OFDMA signals, in accordance with some arrangements. The system 200 may include components and elements configured to support known or conventional operating features that need not be described in detail herein. In some arrangement, the system 200 can be used to communicate (e.g., transmit and receive) data symbols in a wireless communication environment such as the wireless communication environment 100 of FIG. 1, as described above.

The system 200 generally includes a base station 202 and a UE 204. The base station 202 is an example of the base stations 111 and 112. The UE 204 is an example of the UE 101. The base station 202 includes a base station (BS) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The base station 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some arrangements, the UE transceiver 230 may be referred to herein as an uplink transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a downlink transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some arrangements, there is close time synchronization with a minimal guard time between changes in duplex direction.

The UE transceiver 230 and the BS transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the BS transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

In accordance with various arrangements, the base station 202 may be an gNB, evolved node B (eNB), a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between BS transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that BS transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Some arrangements relate to supporting UE-initiated panel activation and selection via UE reporting a list of UE capability value sets. The correspondence between each reported Channel State Information Reference Signal (CSI-RS) and/or Synchronization Signal/PBCH block (SSB) resource index and one of the UE capability value sets in the reported list is determined by the UE and is informed to the network (e.g., the base stations 111 and 112) in a beam reporting instance.

The arrangements of the present disclosure relate to allowing the UE to determine panel activation, including when switching between a single panel and a combination of panels, thus enabling the UE to save power.

In some arrangements, the UE reports capability concerning a panel (e.g., antenna configuration, etc.) as, for example, at least one panel mode or mode. The UE capability can be based on UE hardware configuration. Next, the network (e.g., one of base stations 111 or 112) configures one or more modes for the UE and configures SRS/CSI-RS aligning with the configured modes. In some examples, the UE can report recommendation for panel mode (e.g. a new mode) based on measurement or power saving requirement. The network may respond and/or confirm the recommendation. In some arrangements, a period after the reporting or confirmation, the new panel mode becomes applicable.

Figure 3:
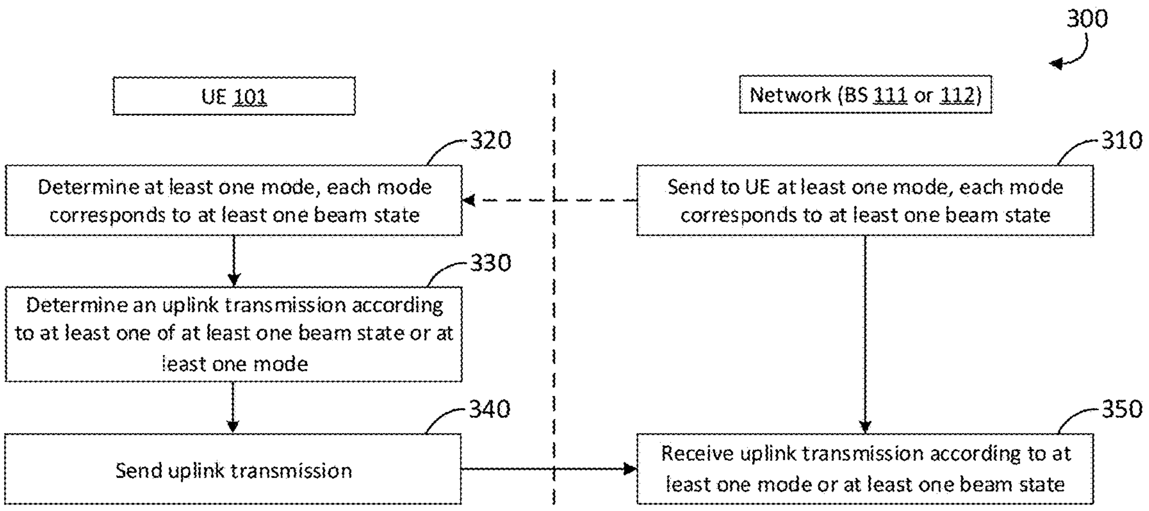
FIG. 3 is a flowchart diagram illustrating an example method for mode switching, according to various arrangements.

In that regard, FIG. 3 is a flowchart diagram illustrating an example method 300 for mode switching, according to various arrangements. Referring to FIG. 3, the method 300 can be performed by the UE 101 and the network (e.g., the base station 111 or 112).

At 320, the UE 101 determines at least one mode (e.g., panel mode). Each of the at least one mode corresponds to at least one beam state. In some examples, the UE 101 determines one SSBRI/CRI, which corresponds to a mode. In some examples, the UE 101 determines two or more SSBRI/CRI, each of which corresponds to a mode (thus, multiple modes can be determined). The UE 101 can determine the at least one mode based on 1) the UE's sole determination (e.g., without any input from the network), 2) based on the network's response to the UE's reporting of its capability (e.g., the one or more capability sets), 3) based on the network's configuration or indication, which is not a response to the UE's reporting of its capability, or 4) based on Media Access Control (MAC) Control Element (CE)/Downlink Control Information (DCI) received by the UE from the network indicating a change or update to the beam for uplink transmissions (e.g., for SRS). In the example in which the UE 101 determines the at least one mode based on the MAC CE or DCI indicating change or update to the beam for uplink transmissions, the new beam state is used to determine a mode.

In some arrangements, each of the at least one beam state includes one or more of an RS resource (e.g., an RS may include a downlink RS (e.g. CSI-RS), SSB, an uplink RS (e.g., an SRS)), an RS resource indicator, an RS resource set, an RS resource set indicator, a TCI state indicator, a spatial relation indicator, a panel indicator, a panel combination indicator, a TRP indicator, an antenna port, a group of antenna ports, an SRI, an SSBRI, a CRI, or so on. In some examples, the definition of "beam state" is equivalent to quasi-co-location (QCL) state, spatial filter or precoding. Furthermore, in this disclosure, "beam state" is also called as "beam."

In some arrangements, each of the at least one mode corresponds to one or more capability sets. Each capability set corresponds to a panel of the UE 101. A mode that corresponds to one capability set is a single-panel mode. A mode that corresponds to two or more capability sets is a multiple-panel mode. In other words, a capability set corresponds to a single-panel mode or a multiple-panel mode. A mode that corresponds to one capability set indicates a single-panel mode or a multiple-panel mode. In some examples, a panel can also be or referred to as a panel entity, an antenna panel, a panel configuration, an antenna configuration, or an antenna group configuration, a panel group, a port group, a transmit port group, or an antenna port group.

In some examples in which one mode corresponds to one capability set, that mode ID corresponds or is mapped to the capability set ID of that capability set. If one mode corresponds to multiple capability sets, that mode can be indicated by the capability set IDs of those multiple capability sets or by a mode ID which corresponds or is mapped to those multiple capability sets.

In some examples in which a mode is a single-panel mode or a capability set corresponds to the single-panel mode, the UE 101 reports the mode ID or capability set ID to the network for each beam state in a beam reporting instance, for all beam states in the beam reporting instance. In some examples in which a mode is a multiple-panel mode or a capability set corresponds to the multiple-panel mode, the UE 101 reports the mode ID or capability set ID to the network for a group of beam states in a beam reporting instance. Each panel indicated by the multiple-panel ID corresponds to a beam state in the group in a predefined order.

In one example in which a mode ID or capability set ID that indicates a panel 1 and a panel 2, the UE 101 reports for a group of beam states (beam state 1 and beam state 2), then beam state 1 corresponds to the panel 1, and beam state 2 corresponds to the panel 2. Alternatively, beam state 1 corresponds to the panel 2, and beam state 2 corresponds to the panel 1.

At 310, the network can send to the UE 101 the at least one mode. For example, 310 includes one of the network sending to the UE 101 a response to the UE's reporting of the UE's capability (e.g., the one or more capability sets), sending to the UE 101 configuration or indication of the at least one mode (which is not a response to the UE's reporting of its capability), or sending to the UE 101 MAC CE/DCI indicating a change or update to the beam for uplink transmissions.

In some arrangements, the UE 101 determines the association between the at least one mode and the at least one beam state. In some arrangements, the UE 101 reports to the network the association between the at least one mode and the at least one beam state. In some arrangements, the UE 101 receives from the network the association between the at least one mode and the at least one beam state.

At 330, the UE determines an uplink transmission according to at least one of the at least one beam state or the at least one mode. In some arrangements, the uplink transmission includes at least one of an SRS transmission, a PUSCH transmission, or a PUCCH transmission.

In some examples, for a PUSCH transmission, the network indicates a beam state to the UE 101 for determining precoder and/or transmit port information. The UE 101 determines the precoder and/or transmit port information based on the beam state. The mode corresponding to the beam state can provides information on scheduling. For example, the UE 101 can determine an SRS resource or an SRS resource set corresponding to the mode for the PUSCH transmission. For example, the number of ports of the related SRS resource or SRS resource set should align with the mode.

In some examples, a mode indicates, corresponds to, or maps to a max number of ports that equals to 4. When a beam state corresponding to the mode is used for transmitting a PUSCH, the max number of ports for the PUSCH can be 4. Therefore, the max number of ports of the SRS resource indicated by an SRI for the PUSCH transmission is 4.

In some examples, a mode indicates, corresponds to, or maps to 2 ports, and the SRS resource is configured with 4 ports, only the first 2 ports can be used or the SRS resource is not allowed for the mode. In some examples in which a mode indicates, corresponds to, or maps to 4 ports, and the SRS resource is configured with 2 ports, the SRS resource fails to be capable with the mode. Such situation should be avoided.

In some arrangements, the beam state can be a downlink RS or SRS. In some arrangements, determining the uplink transmission according to the at least one beam state includes determining an SRS or a PUCCH transmission according to the at least one beam state as indicated by a spatial relation. The network can indicate a spatial relation for a SRS transmission or a PUCCH transmission. The spatial relation can be a downlink RS or SRS.

In some arrangements, determining the uplink transmission according to the at least one beam state includes determining a PUSCH transmission according to the at least one beam state as a spatial relation of the SRS resource indicated by an indicated SRI. In some arrangements, the network can indicate an SRI for a PUSCH transmission. The SRI indicates one or more SRS resources.

In some arrangements, determining the uplink transmission according to the at least one beam state includes determining a PUSCH, PUCCH, or SRS transmission according to the at least one beam state as a reference RS of the indicated Transmission Configuration Indicator (TCI) state. In some arrangements, the network can indicate a TCI state for a PUSCH transmission, PUCCH transmission, or a SRS transmission. A downlink RS or SRS can be indicated in the TCI state.

In some arrangements in which the uplink transmission is an SRS transmission, the UE determines whether to transmit the SRS transmission based on the determined mode. In this case, a beam state can be a downlink RS, an SRS resource, or an SRS resource set.

For SRS resources with usage of beam management, each SRS resource set corresponds to a mode or a capability set. In an example in which the UE 101 supports 2 panels, a panel 1 with a max number of 4 ports and 4 beams (for beam management, also reflected as number of SRS resources in a SRS resource set for beam management) and a panel 2 with a max number of 2 ports and 2 beams (for beam management), the network configures 2 SRS resource sets, a first set with 4 resources and a second set with 2 resources for the UE for beam management, for panel 1 and panel 2 respectively. The relationship between the panels and the SRS resource sets (also one or more SRS resources in the SRS resource set) can be explicitly indicated by the network (e.g., a mode index or capability set index is indicated for a SRS resource set) or implicitly indicated (and determined by the UE 101).

In this case, in the example in which a mode of only the panel 1 is determined (which means that the panel 2 is not activated or is inadequate as determined by the UE 101), only SRS resource set 1 which is related with mode 1 is transmitted, and SRS resource set 2 is not transmitted (e.g., not transmitted for periodic SRS). Whether such SRS resource or SRS resource set can be transmitted is also determined by a parameter which can enable or disable the function.

For usage of codebook, non-codebook, or antenna switching SRS resource (set), the spatial relation (also referred as reference RS, or source RS) of the SRS resource can be downlink RS or SRS (for beam management). The relationship between a downlink RS and a mode can be determined by reporting (e.g., the first message as described herein). A relation between an SRS and a mode can be determined in the manner described herein. Only SRS resource related or mapped to the determined mode can be transmitted, and the SRS resource unrelated or not mapped to the determined mode is not transmitted.

At 340, the UE sends the uplink transmission to the network, and the network receives the uplink transmission at 350. The uplink transmission is determined according to the at least one mode or the at least one beam state by the UE 101.

In some arrangements, the UE 101 reports at least one a panel-related mode (e.g., a mode ID) to the network.

In some arrangements, the UE determines at least one panel-related mode (or panel mode, or mode) based on signal strength measurements or power saving requirements. The mode is identified by a mode ID. The UE reports the at least one mode (e.g., the mode ID) to the network. The mode can be a recommended panel mode that, from the UE's perspective, is a better mode to use as compared to the current mode that the UE is currently using.

Each recommended mode corresponds to one parameter or a set of parameters (e.g., UE capability set). The parameter or the set of parameters relate to one or more panels of the UE 101. Therefore, the recommended mode can be replaced by a set of parameters. The mode ID can be replaced by a set ID corresponding to the set of parameters. In some arrangements, the UE 101 reports the one or more capability sets (corresponding to the one or more modes) to the network, and the network receives the same. The network can send the one or more capability sets (configured by the network for the UE 101) to the UE 101, and the UE 101 receives the same.

As described, the UE determines an uplink transmission according to the at least one mode. Each of the at least one mode corresponds to at least one beam state. In some examples, the beam state is or includes one or more of a RS resource, an RS resource indicator, a TCI state indicator, a spatial relation indicator, SRI, SSBRI, or CRI. In some examples, each of the at least one mode corresponds to a pair of SSBRI/CRI and L1-RSRP/SINR in the beam reporting UCI. The uplink transmission can include at least one of an SRS transmission, a PUSCH transmission, or a PUCCH transmission.

In some arrangements, the network receives the recommended panel mode and sends a response to the recommended panel mode to the UE 101. The UE 101 receives the response to the recommended panel mode from the network.

The response includes a confirmation of the recommended panel mode in some examples. The confirmation indicates that the network has received the reporting of the recommended panel mode successfully from the UE 101 and agrees with the UE 101 to switch to the recommended panel mode as reported. In some examples, the response further includes a new panel mode (e.g., a new panel mode ID). The new panel mode ID may be the mode ID of the recommended panel mode in the situations in which the network agrees with the recommended panel mode, or the new panel mode ID may be different from the mode ID of the recommended panel mode. The UE determines that the new panel mode is to be applied to one or more panels of the UE 101 a period of time after or responsive to receiving the response. For example, the UE 101 applies the one or more parameters corresponding to the new panel mode ID to the one or more panels after or responsive to receiving the response.

In some examples, the UE 101 reports to the network a first message, the first message includes an indication of the at least one mode. In other words, the UE 101 reports the recommended mode using the first message. The first message is reported by the UE 101 to the network in a MAC CE or in UCI. In some examples, both the at least one mode and the at least one beam state corresponding thereto are carried in the same first message. In some examples, one of the at least one mode corresponds to one of the at least beam state in the first message. In some examples, one of the at least one mode corresponds to a group of the at least beam state in the first message. In some examples, one of the at least one mode corresponds to all of the at least beam state in the first message.

In some arrangements, the UE 101 reports the recommended panel mode (e.g., the mode ID thereof) to the network via a MAC CE, i.e. the first message. In some arrangements, the UE 101 reports the recommended panel mode (e.g., the mode ID thereof) to the network along with beam reporting, as part of UCI, i.e. the first message.

In some examples, the UE 10 reports the at least one recommended mode (which reflects panel/antenna information at UE side) along with a pair of SSBRI/CRI and L1-RSRP/SINR in the beam reporting UCI. In other words, a downlink beam pair is reported. The downlink beam pair downlink beam pair is from a downlink RS (e.g., SSBRI/CRI, which indicates a beam at network side) to panel/antenna information at the UE side (which may reflect a beam at UE side). The downlink beam pair can be used to determine a corresponding uplink beam pair when correspondence exists between the downlink beam pair and the uplink beam pair. The UCI can be carried in PUCCH or in PUSCH.

In some examples, the beam reporting can be group-based, meaning that a group of beams can be reported as a group. The UE 101 can receive the downlink transmission(s) using the beams within a group simultaneously.

In some examples, the UE 101 can indicate to the network whether the beams in a group can be used for uplink transmissions simultaneously. The indication for capability of simultaneous uplink transmission can be provided per group. In an example in which 2 beams are to be reported for within group 1, first SSBRI/CRI and first L1-RSRP/SINR are reported for beam 1, and second SSBRI/CRI and second L1-RSRP/SINR are reported for beam 2. The UE 101 further reports an indication of whether the beams in group 1 can be used for simultaneous uplink transmission to the network. For example, the UE 101 uses an 1-bit with value "1" indicating that the beams of group 1 can be used for simultaneous uplink transmissions, and a value of "0" indicating that the beams of group 1 cannot be used for simultaneous uplink transmissions.

In some arrangements, the UE 101 can indicate to the network whether the at least one beam state corresponding to a beam reporting group is capable of being used for uplink transmission simultaneously. For downlink transmissions, in the examples in which the UE 101 is enabled for group-based beam reporting, the UE 101 reports in a single reporting instance N (e.g., N>=1) group(s) (e.g., beam reporting group(s)) of two CRIs or SSBRIs selecting one CSI-RS or SSB from each of the two CSI Resource Sets for the report setting, where CSI-RS and/or SSB resources of each group can be received simultaneously by the UE 101. For uplink transmission, the UE 101 indicates in a single reporting instance whether beam states (e.g., CSI-RS or SSB) in a group (e.g., a beam reporting group) can be used for uplink transmission simultaneously. An indication can be used for each group, or a common indication can be used for all groups. The indication can be 1 bit. The indication can be reported by the UE 101 in the single reporting instance as for downlink transmission.

In some arrangements, the UE 101 determines the reported recommended panel mode based on at least one of UE capabilities and/or Radio Resource Control (RRC) configuration.

In some arrangements, the UE 101 determines a bit size of the indication of the at least one mode based on a number of reported capability sets or a number of capability sets configured by the network. For instance, the UE 101 can determine the size of the reported recommended panel mode as a predefined number of bits, e.g. 1 bit, 2 bits, or so on. The UE 101 can determine the size of the reported recommended panel mode based on reported UE capability and/or RRC configuration. Examples of the RRC configuration include one or more panel modes configured to the UE 101 by the network, subject to UE capability. Examples of the RRC configuration can further include one or more downlink/uplink RS resource or RS resource set configured to the UE 101 by the network, subject to UE capability.

The size of the reported recommended panel mode can be determined using $\lceil \log_2 (Y) \rceil$ or $\lceil \log_2 (Y+1) \rceil$, where the number of candidate reported modes corresponding to the reported UE capability or RRC configuration is Y. In some examples, the 1 in Y+1 refers to the reserved value for a special mode, which is that no mode corresponds to a reported downlink RS, and the RS is a downlink-only RS, and cannot be indicated for uplink transmission.

In some arrangements, the UE 101 reports that one or more of the at least one beam state are used for downlink transmission. In some arrangements, the UE 101 reports to the network that one or more of the at least one beam state are used for downlink transmission by reporting a value indicating that there is no mode for each of the one or more of the at least one beam state corresponding to the value.

In some examples in which a panel of the UE 101 is a downlink-only panel, the downlink-only panel can be used for receiving data from the network but not for transmitting data to the network. In such examples, the UE 101 does not need to report the downlink-only panel (e.g., the downlink-only panel is not a recommended panel mode). In this case, a reserved value of "none" or "null" can be reported for the corresponding downlink RS indicator, e.g. SSBRI/CRI #3, as shown in the table 400 in FIG. 4. In this case, the size of the reported recommended panel mode can be determined using $\lceil \log_2(Y+1) \rceil$, where the number of candidate reported modes corresponding to the reported UE capability or RRC configuration is Y.

Alternatively, in some arrangements, an additional flag can be used to indicate that a RS corresponding to a downlink RS indicator is a RS for downlink-only transmission. In such arrangements, no mode indicator is needed for the downlink RS indicator.

In some arrangements, the recommended panel mode corresponds to a UE capability set index. The UE capability set index can be determined for a given Component Carrier (CC) or for a given CC group. A CC group is a set of CCs in a band-combination, e.g., frequency band, FR1, FR2, and so on. The UE 101 can report several recommended panel modes for a given CC or for a given CC band-combination. Then, the CC associated with the UE capability set index to be reported is determined according to the CC of CSI-RS/SSB, rather than the CC related to PUCCH/PUSCH. In some arrangements, the UE 101 determines the at least one mode or at least one capability set corresponding to each of the at least one mode for at least one of a bandwidth part (BWP), a CC, a group of CCs, a group of CCs within a band, all BWPs in a CC, all BWPs in a group of CC, or all BWPs in a group of CCs within a band.

In some arrangements, the UE 101 reports to the network at least one mode as UE capability. In other words, the UE 101 reports to the network panel-related capabilities of the UE 101 corresponding to at least one panel mode. Each of the at least one mode corresponds to a panel or a set of panels (a panel combination) of the UE 101. A panel of the UE 101 includes a set of one or more antennas or a set of one or more antenna arrays. The UE capabilities or panel-related capabilities correspond to panel or antenna configuration based on hardware of the UE 101. In response to receiving the report of the UE capability, the network configures one or more panel modes via RRC signaling, for example, based on the reported UE capability.

In some arrangements, the UE 101 supports multiple panels. Two or more panels may correspond to different capabilities on beam management. The UE 101 reports a number, e.g., NO, of SRS resource set for beam management. For each SRS resource set, the UE 101 can report a number, e.g. N1, of SRS resources for beam management. An SRS resource set for beam management may correspond to a panel in the UE.

In some arrangements, a mode can be a first-type (single-panel) mode or a second-type (multi-panel) mode. In other words, each of at least one capability set corresponding to each of the at least one mode or each of the at least one mode corresponds to a first-type mode or a second-type mode. In some examples, a first-type (single-panel) mode is defined by and the panel-related capabilities of the first-type (single-panel) mode includes at least one of a number of ports (e.g., a supported maximum number of ports), a number of ranks (e.g., a supported maximum number of ranks), a coherence type (e.g., coherent, partial coherent, non-coherent), a supported Transmitted Precoding Matrix Indicator (TPMI)/TPMI group, a full-power mode (e.g., a full-power mode 1/2), a power control mode, a number of SRS resources (e.g., within an SRS resource set for beam management), or so on. In some examples, a second-type (multi-panel) mode is defined by and the panel-related capabilities of the second-type (multi-panel) mode includes at least one of a supported maximum number of ports, a supported maximum rank, a number of first-type modes corresponding to the second-type mode, a list of first-type modes (or a list of IDs thereof), capability of multi-panel simultaneous transmissions, capability of multi-panel simultaneous transmission of uplink signals, or so on. In some examples, the first-type mode corresponds to a panel, a type of panel or a group of antenna ports of the UE 101. In some examples, the second-type mode corresponds to more than one panel, more than one type of panel or more than one group of antenna ports of the UE 101.

The uplink signal includes at least one of a PUCCH, a PUSCH, or SRS. The capability can be at least one of multi-panel simultaneous transmission of uplink signals includes, for example, PUSCH and PUSCH corresponding to different panels, PUCCH and PUCCH corresponding to different panels, SRS and SRS corresponding to different panels, PUSCH and PUCCH corresponding to different panels, PUSCH and SRS corresponding to different panels, PUCCH and SRS corresponding to different panels, or so on.

In some arrangements, a UE 101 can support any panel combination to transmit uplink transmissions simultaneously. The UE 101 reports an indication of whether the beams corresponding to different first-type modes can be used for uplink transmissions simultaneously.

In some examples, the second-type mode is absent. The max number of ports, or maximum number of rank of a panel combination, e.g. a multiple-panel mode, via a second type mode, is determined by max number of ports, or maximum number of each panel corresponding to at least one first-type mode related to the second type mode. For example, the max number of ports of a panel combination, e.g. corresponding to a second type mode, is determined by the sum of the max number of ports of each panel corresponding to a first-type mode in the second type mode. The max number of ranks of a panel combination is determined by the sum of max number of ranks of each panel corresponding to a first-type mode.

In an example in which panel 1 supports a max number of ports of 2, and panel 2 supports a max number of ports of 4, the panel combination including panel 1 and panel 2 supports a max number of ports of 2+4=6.

Figures 4, 5:
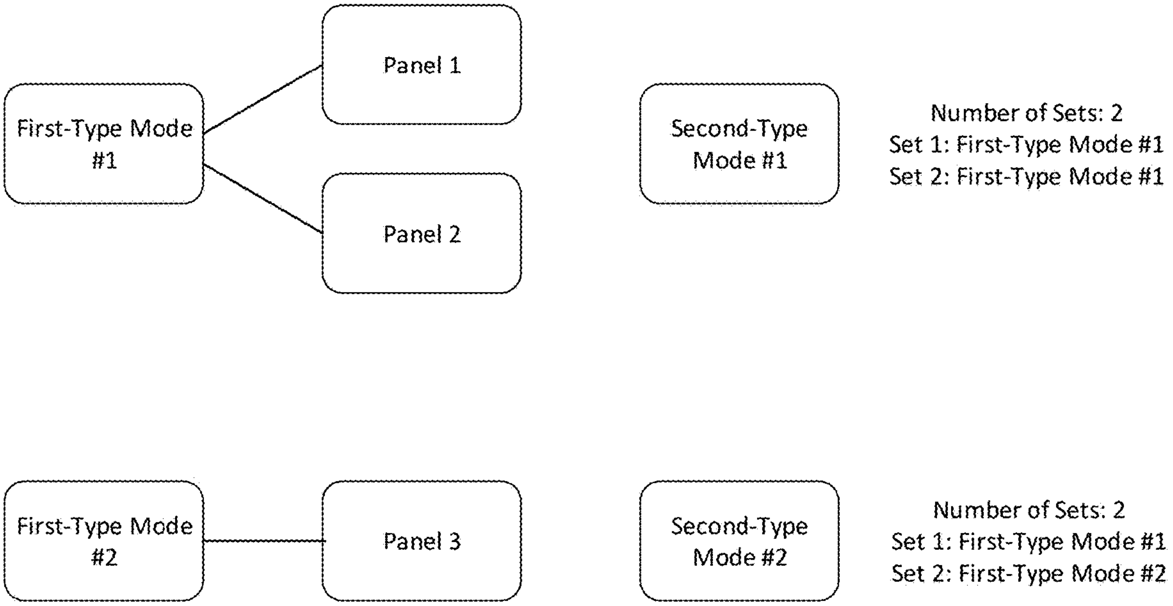
FIG. 4 is a table illustrating an example relationship between downlink Reference Signal (RS) indicators, L1-Reference Signal Received Power (RSRP)/Signal to Interference and Noise Ratio (SINR) (L1-RSRP/SINR), and mode indicators, according to various arrangements.
FIG. 5 is a diagram illustrating examples of first-type mode and second-type mode, and panels associated therewith, according to various arrangements.

In some examples, each of the at least one first-type mode corresponds to a type of panel or a specific panel of the UE 101. FIG. 5 is a diagram illustrating examples of first-type mode and second-type mode, and panels associated therewith, according to various arrangements.

In some examples, the UE 101 supports 2 panels, e.g., the panel 1 and panel 2, where the panel 1 and panel 2 are the same type. Transmissions can be sent and/or received using panel 1, panel 2, or the panel combination including panel 1 and panel 2 (for multi-panel simultaneous transmission). In the examples in which the first-type mode corresponds to a type of panels, and the mode includes a first-type mode for panel 1 and panel 2, the at least one mode reported by the UE 101 to the network includes Mode 0 (e.g., first-type panel mode 0 for panel 1 and panel 2, which are of the same type) and Mode 1 (second-type panel mode 0 for the combination of panel 1 and panel 2). In the examples in which the first-type mode corresponds to a specific panel, the at least one mode includes 2 first-type modes for panel 1 and panel 2. The at least one mode reported by the UE 101 to the network includes Mode 0 (first-type panel mode 0, for panel 1), Mode 1 (first-type panel mode 1, for panel 2), and Mode 2 (second-type panel mode 0, for the combination of the panel 1 and panel 2).

In some examples, the UE 101 supports 3 panels, e.g., a panel 1, a panel 2, and a panel 3, where the panel 1 and panel 2 are the same type, while the panel 3 has a different type. Transmissions can be sent and/or received using the panel 1, panel 2, or panel 3 for single-panel transmission in some arrangements. In some arrangements, transmissions can be sent and/or received using panel 1 and panel 2, panel 1 and panel 3 for multi-panel simultaneous transmission. However, the UE 101 cannot support panel 2 and panel 3 for multi-panel simultaneous transmission.

If the first-type mode corresponds to a type of panel, the at least one mode includes 2 first-type modes for 2 types of panel 1, panel 2 and panel 3, and 2 second-type panel modes for the panel combinations. The at least one mode includes Mode 0 (first-type panel mode 0, for panel 1 and panel 2 with same type), Mode 1 (first-type panel mode 1, for panel 3 with a different type from panel 1), Mode 2 (second-type panel mode 0, for the combination of the panel 1 and the panel 2), and Mode 3 (second-type panel mode 1, for the combination of the panel 1 and panel 3).

Accordingly, dynamic switching between a single-panel mode and a multi-panel mode can be flexibly supported. For example, the UE 101 can report at least one mode as UE capability. The network can configure one or more modes, for example, via RRC signaling as UE capability. Then, the UE 101 can report recommendation about panel mode (e.g., the recommended panel mode) based on measurements or power saving requirements. The recommended panel mode is from a candidate mode set of UE capability reported by UE 101, or from a candidate mode set of RRC configuration by the network.

In some arrangements, the network responds to the recommendation or the reported mode received from the UE 101. In this case, the mode is recommended by the UE 101.

In some arrangements, the network responds to the beam reporting received from the UE 101 by indicating a mode to UE 101. In this case the mode is recommended by the network (e.g., the base station 111 or 112). The mode can be same as or different from UE's recommendation.

In some arrangements, the network can indicate a mode to UE 101. In this case, base station does not respond to beam reporting from the UE 101, which means that no response is provided for the beam reporting. The network sends an order or indication to update or change the mode to the UE 101. Given that beam reporting does not need to be responded to, the network indicates a mode to UE via MAC CE or DCI signaling, in addition to configuration by RRC signaling.

Accordingly, in some arrangements, the UE 101 determines the at least one mode at 320 by receiving, by the UE 101 from the network, a second message indicating the at least one mode or the at least one beam state, and determining, by the UE 101, the at least one mode based on the second message. In some examples, the second message indicates at least one mode determined based on capability set of the UE 101. In some examples, the second message is a response by the network to the first message transmitted by the UE 101 to the network. In some examples, the second message indicates the at least one mode determined by the network based on the first message. In some examples, the second message indicates one or more of the at least one mode in the first message. In some examples, the second message indicates the at least one mode by confirming the at least one mode in the first message.

In some examples, the second message is a MAC CE activating an SRS resource or indicating a spatial relation for the SRS resource. The MAC CE includes one or more of an SRS Spatial Relation Indication MAC CE, an SRS Activation/Deactivation MAC CE, or so on. The spatial relation in such a second message is a beam state which can be a downlink RS or SRS. The beam state is related or mapped to a mode. Determining the at least one mode based on the second message includes determining the at least one mode based on the beam state indicated by the second message.

In other examples, the second message is an indicated TCI state message. For example, the second message can be a MAC CE that indicates one TCI state or a group of TCI states corresponding to a codepoint. The second message can be a DCI which indicates a TCI state or a group of TCI states corresponding to a codepoint. The indicated one or a group of TCI states (also referred to as a unified TCI state or common TCI state) can be used by the UE 101 to determine SRS transmission. The codepoint refers to an entry for one or more of TCI states which can be indicated by a value in TCI field in a DCI.

Upon receiving from the network a mode indication or the response with or without a mode indication, the UE 101 activates or deactivates a panel according to the mode indication. The mode indication can be a recommendation from UE, a recommendation from the network as a response of beam reporting, or a recommendation from the network that is sent to the UE 101 independent of the beam reporting.

The UE 101 may activate or deactivate a panel according to the mode indication in response to or after the mode becomes applicable.

In some arrangements, the UE 101 may activate or deactivate a panel according to the mode indication in the example in which the function of activating/deactivating a panel is enabled. Such function can be activated or deactivated based on RRC configuration or due to UE capability.

In some arrangements, the network's response or the mode indication can be one of 1) a DCI with a field or a value to indicate the mode update; 2) a DCI with a TCI state indicator field and a mode ID which is the reported mode ID (e.g., the TCI state and the set ID/specific bit/field to indicate the update, e.g., New Data Indicator NDI, where the association is indicated by the MAC-CE); 3) a DCI with NDI and the same Hybrid Automatic Repeat Request (HARM) process ID for PUSCH carrying the L1-report; 4) DCI to trigger the SRS resource set associated with the reported mode; 5) a new MAC-CE for acknowledging the mode update; or 6) a MAC-CE to activate the SRS resource set associated with the reported mode.

The association between SRS resource set and mode ID is configured by RRC signaling or activated by MAC CE.

In some arrangements, the new mode becomes applicable a period after or in response to the report or confirmation. In some examples, the UE 101 determines that the at least one mode is applied to uplink transmissions starting from a first slot for the application that is a period of time after or in response to the first message or after or in response to the second message, e.g., in some examples, the period of time after the last symbol of the first message transmission or the period of time after the last symbol of the second message. The period of time includes a number of time units. The time unit can be a symbol, an OFDM symbol, a slot, a sub slot, subframe, frame, a second, a millisecond, microsecond, or so on. The period of time can be configured by the network based on the capability of the UE 101, in some arrangements. In some arrangements, the period of time can be determined by the UE 101. In some examples, the period of time can be determined based on a basic SCS (e.g., 15 kHz), an SCS of the CC on which the reporting is transmitted, or an SCS of the CC which the reporting is targeting. In some examples, the first slot for the application or the period of time is determined based on a carrier with smallest SCS among at least one carrier of at least one of a carrier applying the at least one mode, a carrier of an active downlink BWP for receiving a second message indicating the at least one mode or the at least one beam state, or a carrier of an active uplink BWP for the first message transmission.

In some arrangements, the UE 101 determines that the at least one mode is applied when the corresponding beam state is applicable. The corresponding beam state is the beam state associated with the at least one mode, or the TCI state which includes the beam state associated with the at least one mode. A TCI state is applicable starting from the first slot that is at least a number (e.g., X) symbols after the last symbol of the PUCCH which carries HARQ-ACK for the PDCCH with DCI indicating the TCI state, where X is determined based on UE capability, or configured to the UE 101 by the network. Thus, in some examples, the period of time can be the same as the beam application time for unified/indicated TCI state.

In some arrangements, when or after the new mode becomes applicable, SRS resource(s) is transmitted according to the new mode. In other words, the UE 101 determines at least one SRS resource according to the at least one mode.

In some examples, an SRS resource or SRS resource set associated with the new mode is transmitted. In other words, an SRS resource or SRS resource set not associated with the new mode is not transmitted. For an SRS resource set with usage of beam management or SRS resource within such SRS resource set, the SRS resource or SRS resource set associated with the new mode is determined as SRS resource or SRS resource set with usage of beam management associated with the new mode. In some examples, an SRS resource set with usage of beam management is associated with a first-type mode. In some examples in which the new mode is a second-type mode, at least one first-type mode can be determined by the new mode. The SRS resource set is determined as SRS resource set with usage of beam management associated with at least one first-type mode determined by the new mode.

For an SRS resource set with usage of codebook, non-codebook, or SRS resource within such SRS resource set, the SRS resource or SRS resource set associated with the new mode is determined as SRS resource or SRS resource set with usage of beam management associated with the new mode. An SRS resource set with usage of codebook or non-codebook is associated with a first-type mode. Alternatively, an SRS resource within an SRS resource set with usage of codebook or non-codebook is associated with a first-type mode. In the example in which the new mode is a second-type mode, at least one first-type mode can be determined by the new mode. SRS resource set is determined as SRS resource set with usage of codebook or non-codebook associated with at least one first-type mode determined by the new mode.

In some arrangements, some of SRS resources with more ports than indicated UE capability is not transmitted/dropped. In some arrangements, an SRS resource can be transmitted with number of ports not beyond the indicated UE capability (reported mode). For example, for a 4-port SRS resource, when the max number of 2 ports is indicated, only port-0 and port-1 are transmitted. The port which is beyond the indicated UE capability (reported mode) is not transmitted.

Accordingly, determining at least one SRS resource according to the at least one mode further include at least one of transmitting a SRS resource or a SRS resource set associated with the at least one mode, dropping a SRS resource or a SRS resource set not associated with the at least one mode, dropping SRS resources with more ports than a number of ports corresponding to the at least one mode, transmitting an SRS resource with the number of ports not greater than the number of ports corresponding to the at least one mode, or dropping a port index which is greater than the number of ports corresponding to the at least one mode.

The time-domain behavior of the UE 101 reporting the first message can be one of periodic, semi-persistent, or aperiodic. The UE 101 may report a recommended value for periodicity for periodic or semi-persistent transmission of the first message. In that regard, in some arrangements, the UE 101 reports a value for a periodicity for reporting one or more capability sets or the at least one mode. The UE 101 can report a recommended value for offset for the aperiodic or semi-persistent. In that regard, the UE 101 indicates a value for an offset for reporting one or more capability sets or the at least one mode. In some arrangements, the indicated periodicity or the offset is associated with one of the at least one mode or a capability set. In some arrangements, at least one of the value of indicated periodicity or the offset is indicated from a respective one of a predefined periodicity or an offset value set.

In some arrangements, at least one of the indicated periodicity or the indicated offset is applied by the UE 101 when or after a respective one of the associated at least one mode or the associated one or more capability sets is applicable. In some arrangements, at least one of a periodicity or an offset is configured by the network to be equal to a respective one of the reported periodicity or offset. In some arrangements, the periodicity configured by the network is no greater than or no less than the reported periodicity. In some arrangements, the offset configured by the network no greater than or no less than the reported offset. Whether using a periodicity or an offset that is no greater than or no less than the reported value depends on a predefined rule, or based on a parameter reported by the UE 101 to network.

In some examples, PUSCH is scheduled by a uplink DCI (e.g., DCI format 0_0, 0_1, or 0_2). In such examples, the scheduling includes dynamic scheduling a PUSCH which is referred to as a Dynamic Granted (DG) PUSCH or includes triggering a PUSCH which is referred to as a type-2 Configuration Granted (CG) PUSCH. Type-2 CG PUSCH is a semi-persistent PUSCH. RRC signaling configures a part of scheduling information. A DCI activates/triggers to start a PUSCH transmission and with a periodicity for the subsequent PUSCH transmissions.

If a PUSCH is scheduled by a DCI format 0_0, spatial relation and PL-RS of PUSCH transmission is determined by a configuration of PUCCH or a default beam which is based on a lowest CORESET ID. If a PUSCH is scheduled by a DCI format 0_1 or 0_2 with a SRI field, the PUSCH is transmitted according to SRS resource indicated by the SRI field. If a PUSCH is scheduled by a DCI format 0_1 or 0_2 without a SRI field, and the number of SRS resources in a SRS resource set is 1, PUSCH is transmitted according to the SRS resource in the SRS resource set.

In the case in which unified TCI can be applied for a UE, once a TCI is indicated, the unified TCI is applied to at least one target signal. The target signal includes one or more of PDCCH (or CORESET, Search Space), PDSCH, CSI-RS, PUCCH, PUSCH, or SRS. The unified TCI can be indicated by a DL DCI (e.g., DCI format 1_1, or 1_2) with or without a scheduling/grant information for the UE 101. A unified TCI state can be associated with at least one power control parameter if the unified TCI state can be used for uplink. Once a unified TCI state is applicable, the unified TCI is applied to the target signal. Power control parameters associated with the unified TCI state can also be applied to the uplink target signal. Once a TCI state is indicated, it is applicable for an SRS and a PUSCH at the same time. However, if a PUSCH is indicated to follow an SRS transmission, the unified TCI is supposed to be applicable for PUSCH via SRS indirectly, not directly.

A power control parameter includes at least one of open-loop power control parameter (e.g., P0 target received power), alpha (e.g., pathloss compensation factor), closed-loop power control parameter (e.g., closed-loop power control index or number of closed-loop power control loops), or pathloss measurement parameter (e.g., an RS for pathloss measurement, also noted as PL-RS).

In general, if unified TCI is enabled, power control parameters of PUSCH are supposed to be determined according to unified TCI. Spatial relation of PUSCH is supposed to be determined by latest SRS resource indicated by SRI or the only one SRS resource in a SRS resource set.

Figure 6:
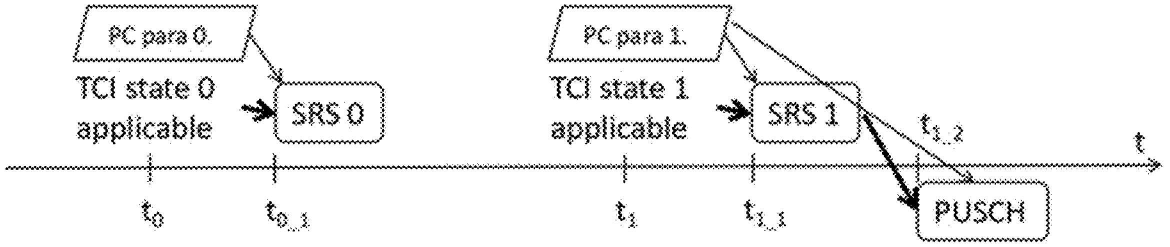
FIG. 6 is a diagram illustrating application of a power control parameter.

FIG. 6 is a diagram illustrating application of a power control parameter. As shown in FIG. 6, TCI state 1 (a unified TCI state) is applicable at time $t_1$. TCI state 1 is associated with power control parameters 1 (PC para 1). SRS 1 is transmitted at $t_{1\_1}$, which is later than $t_1$. Thus, SRS 1 is transmitted according to TCI state 1, for example, by determining spatial relation and power control parameters according to TCI state 1. A PUSCH is scheduled or transmitted at $t_{1\_2}$, which is later than $t_{1\_1}$. The PUSCH is transmitted according to a latest SRS which is SRS 1 for determining spatial relation. Power control parameters for the PUSCH are determined by latest/current applicable TCI state, which is TCI state 1. In the case shown in FIG. 6 spatial relation and power control parameter for PUSCH are both determined by TCI state.

Figure 7:
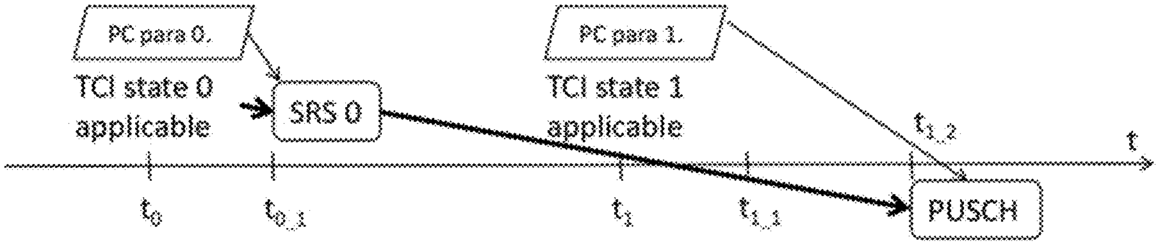
FIG. 7 is a diagram illustrating application of a power control parameter.

FIG. 7 is a diagram illustrating application of a power control parameter. As shown in FIG. 7, TCI state 1 (a unified TCI state) is applicable at time $t_1$. TCI state 1 is associated with power control parameters 1 (PC para 1). TCI state 1 provides spatial relation and power control parameters for the uplink target transmission after $t_1$. A PUSCH is scheduled or transmitted at $t_{1\_2}$, which is later than $t_{1\_1}$. Power control parameters for the PUSCH are determined by latest/current applicable TCI state, which is TCI state 1. The PUSCH is transmitted according to a latest SRS which is SRS 0 for determining spatial relation. Spatial relation of SRS 0 is determined according to a TCI state 0 which is applicable since to, which is earlier than to 1. In other words, to is the latest earlier time point for an applicable TCI state. In this case power control parameter for PUSCH is determined by TCI state 1. The spatial relation of PUSCH is determined by TCI state 0. This causes misalignment between spatial relation and power control parameters.

Figure 8:
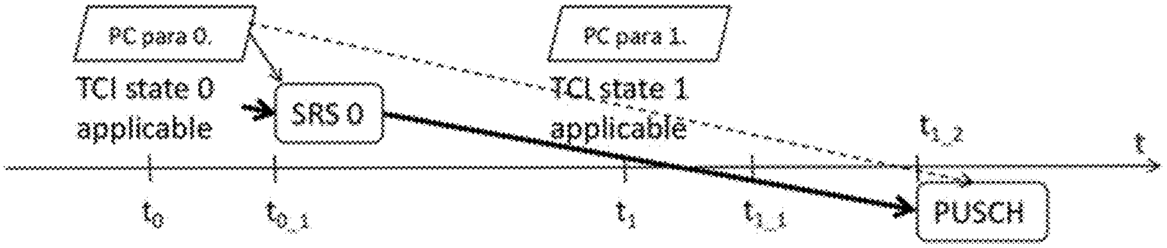
FIG. 8 is a diagram illustrating application of a power control parameter, according to various arrangements.

FIG. 8 is a diagram illustrating application of a power control parameter, according to various arrangements. A spatial relation and power control parameters of the PUSCH is determined according to a same TCI state. As shown in FIG. 8, TCI state 1 (a unified TCI state) is applicable at time $t_1$. TCI state 1 is associated with power control parameters 1 (PC para 1). TCI state 1 provides spatial relation and power control parameters for the uplink target transmission after $t_1$. A PUSCH is scheduled or transmitted at $t_{1\_2}$, which is later than $t_{1\_1}$. In some arrangements, the power control parameters of the PUSCH transmitted at $t_{1\_2}$ is determined according to a TCI state which is the reference/source RS of the SRS that is identified as a reference for determining spatial relation of the PUSCH. Power control parameters 0 (PC para 0) associated with SRS 0 are used for the PUSCH transmitted at $t_{1\_2}$.

In some arrangements, the UE 101 determines at least one of a spatial relation, a precoder, or a transmit port for a PUSCH transmission according to an SRS. The UE 101 determines a power control parameter for the PUSCH transmission according to a reference RS of the SRS. The UE 101 transmits the PUSCH according to the spatial relation and the power control parameter.

In some examples, with regard to determining a spatial relation for a PUSCH transmission according to an SRS, the SRS is determined according to an SRI which is indicated by a SRI field in a DCI which schedules/activates the PUSCH transmission, in some examples. In some examples, the SRS is determined according an SRI which is configured by RRC signaling for the PUSCH transmission, e.g., for a type-1 CG PUSCH. SRI may be needed in the examples in which multiple SRS resources are configured within a SRS resource set. The SRS is determined according to the only one SRS resource if single SRS resource is configured within a SRS resource set.

In the examples in which the UE is configured with the higher layer parameter txConfig set to 'codebook,' the SRS resource set is determined by the SRS resource set with usage of 'codebook.' In the examples in which the UE is configured with the higher layer parameter txConfig set to 'non codebook,' the SRS resource set is determined by the SRS resource set with usage of 'noncodebook.' The indicated SRI in slot n is associated with the most recent transmission of SRS resource identified by the SRI, where the SRS resource is prior to the PDCCH carrying the SRI or prior to the PUSCH.

In some arrangements, with respect to determining a power control parameter for the PUSCH transmission according to a reference RS of the SRS, the reference RS of the SRS is determined by an applicable TCI state for the SRS transmission. When the SRS is transmitted, an current applicable TCI state or a latest applicable TCI state is determined as the reference RS of the SRS. If the applicable TCI state is not available, a default RS (e.g., that which corresponds to a lowest CORESET ID) can be determined. The power control parameter for the PUSCH transmission is determined according to a power control parameter associated with the reference RS of the SRS.

Figure 9:
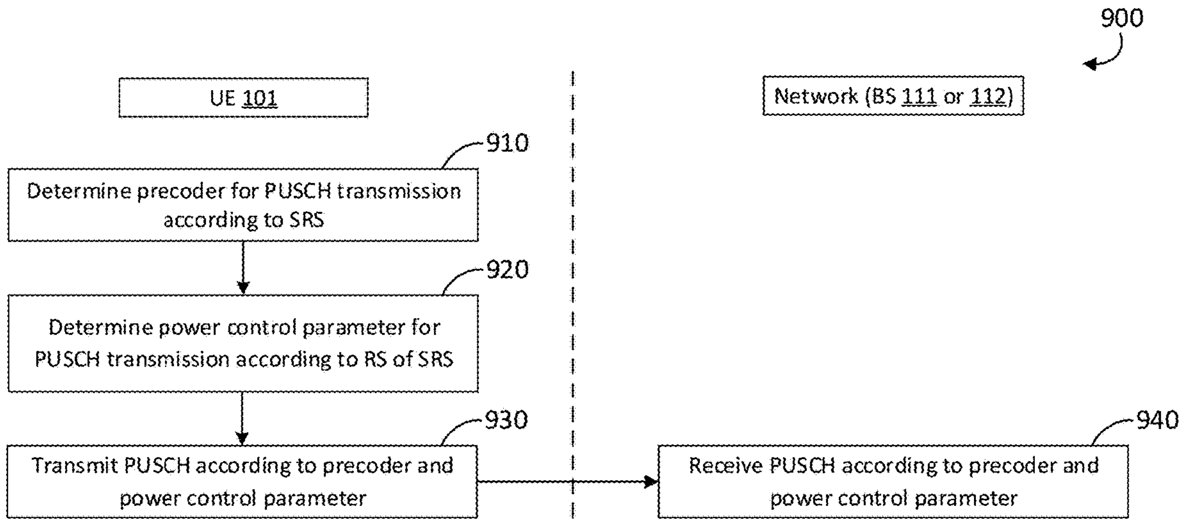
FIG. 9 is a flowchart diagram illustrating an example method for applying a power control parameter, according to various arrangements.

For example, FIG. 9 is a flowchart diagram illustrating an example method 900 for applying a power control parameter, according to various arrangements. The method 900 can be performed by the UE 101 and the network (e.g., the base station 111 or 112), and provides power control for PUSCH with unified TCI.

At 910, the UE 101 determines a precoder for a PUSCH transmission according to an SRS. In some arrangements, determining the precoder for the PUSCH transmission according to the SRS includes determining the SRS according to an SRI. In some arrangements, determining the precoder for the PUSCH transmission according to the SRS includes determining the SRS according to an only SRS resource. A single SRS resource is configured within a SRS resource set.

At 920, the UE 101 determines a power control parameter for the PUSCH transmission according to an RS of the SRS. In some examples, the power control parameter comprises at least one of an open-loop power control parameter, a closed-loop power control parameter, or a path-loss measurement parameter.

In some examples, determining the power control parameter for the PUSCH transmission according to the reference RS of the SRS includes determining the reference RS of the SRS according to an applicable TCI) state for the SRS transmission. In some examples, determining the power control parameter for the PUSCH transmission according to the reference RS of the SRS includes determining the power control parameter for the PUSCH transmission according to a power control parameter associated with the reference RS of the SRS. Further, determining the power control parameter for the PUSCH transmission according to a power control parameter associated with the reference RS of the SRS for PUSCH transmission, e.g. open-looped power control parameters, P0 and alpha, for PUSCH, closed-loop power control parameters, i.e. closed-loop power control index, for PUSCH, or path-loss measurement parameter, PL-RS, for PUSCH (or for SRS, if SRS and PUSCH share the same PL-RS).

In some examples, the power control parameter is determined for the PUSCH transmission according to the reference RS of the SRS in response to determining that no SRS is transmitted after a TCI state is applicable for the SRS, and before the PUSCH transmission or before the PDCCH with a DCI which scheduled the PUSCH transmission, or before a time duration before the PUS CH transmission.

At 930, the UE 101 transmits the PUSCH according to the precoder and the power control parameter. At 940, the network receives the PUSCH transmitted according to the precoder and the power control parameter.

While various arrangements of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:

receiving, by a wireless communication device from a network, a plurality of modes configured by the network for the wireless communication device;

determining, by the wireless communication device, at least one mode from the received plurality of modes, wherein each of the plurality of modes corresponds to at least one beam state;

reporting, by the wireless communication device, that one or more of the at least one beam state are used for downlink transmission by reporting a value indicating that there is no mode for each of the one or more of the at least one beam state corresponding to the value; and determining, by the wireless communication device, an uplink transmission according to at least one of the at least one beam state or the at least one mode.

2. The method of claim 1, wherein each of the at least one mode corresponds to one or more capability sets.

3. The method of claim 2, further comprising:

reporting, by the wireless communication device to a network, the one or more capability sets.

4. The method of claim 1, further comprising:

reporting, by the wireless communication device to a network, a first message comprising an indication of the at least one mode.

5. The method of claim 4, further comprising determining, by the wireless communication device, a bit size of the indication of the at least one mode based on a number of reported capability sets or a number of capability sets configured by the network.

6. The method of claim 4, wherein at least one of:

the at least one mode and the at least one beam state corresponding to the at least one mode are carried in the first message;

one of the at least one mode corresponds to one of the at least beam state in the first message;

one of the at least one mode corresponds to a group of the at least beam state in the first message; or one of the at least one mode corresponds to all of the at least beam state in the first message.

7. The method of claim 1, further comprising at least one of:

determining, by the wireless communication device, an association between the at least one mode and the at least one beam state;

reporting, by the wireless communication device to a network, the association between the at least one mode and the at least one beam state via a first message; or receiving, by the wireless communication device from the network, the association between the at least one mode and the at least one beam state.

8. The method of claim 1, wherein determining the at least one mode comprises:

receiving, by the wireless communication device from a network, a second message indicating the at least one mode or the at least one beam state; and determining, by the wireless communication device, the at least one mode based on the second message.

9. The method of claim 8, wherein:

the second message indicates at least one mode determined based on capability set of the wireless communication device;

the second message is a response to a first message;

the second message indicates the at least one mode determined based on the first message;

the second message indicates one or more of the at least one mode in the first message;

the second message indicates the at least one mode by confirming the at least one mode in the first message;

the second message is a Media Access Control (MAC) Control Element (CE) activating a Sounding Reference Signal (SRS) resource or indicating a spatial relation for the SRS resource; or the second message is an indicated Transmission Configuration Indicator (TCI) state message.

10. The method of claim 1, wherein each of the at least one beam state comprises a Reference Signal (RS) resource;

an RS resource indicator;

an RS resource set;

an RS resource set indicator;

a Transmission Configuration Indication (TCI) state indicator;

a spatial relation indicator;

a panel indicator;

a panel combination indicator;

a Transmission/Reception Point (TRP) indicator;

an antenna port;

a group of antenna ports;

a Sounding Reference Signal (SRS) Resource Indicator (SRI);

a Synchronization Signal (SS)/Physical Broadcast Channel (PBCH) Resource Block Indicator (SSBRI); or a Channel State Information (CSI)-RS Resource Indicator (CRI).

11. The method of claim 1, wherein the uplink transmission comprises at least one of a Sounding Reference Signal (SRS) transmission, a Physical Uplink Shared Channel (PUSCH) transmission, or a Physical Uplink Control Channel (PUCCH) transmission.

12. The method of claim 1, further comprising indicating, by the wireless communication device, whether the at least one beam state corresponding to a beam reporting group is capable of being used for uplink transmission simultaneously.

13. The method of claim 1, further comprising reporting, by the wireless communication device, that one or more of the at least one beam state are used for downlink transmission.

14. The method of claim 1, further comprising determining, by the wireless communication device, the at least one mode or at least one capability set corresponding to each of the at least one mode for at least one of:

a bandwidth part (BWP), a Component Carrier (CC)

a group of CCs, a group of CCs within a band, all BWPs in a CC, all BWPs in a group of CC, or all BWPs in a group of CCs within a band.

15. The method of claim 1, wherein each of at least one capability set corresponding to each of the at least one mode or each of the at least one mode corresponds to a first-type mode or a second-type mode.

16. The method of claim 15, wherein at least one of:

the first-type mode comprises at least one of a number of ports, a number of rank, a coherence type, a supported Transmitted Precoding Matrix Indicator (TPMI)/TPMI group, a full-power mode, a number of SRS resources in an Sounding Reference Signal (SRS) resource set for beam management, or a power control mode; or the second-type mode comprises at least one of a number of ports, a number of rank, a number of first-type modes corresponding to the second-type mode, a list of first-type modes, capability of multi-panel simultaneous transmissions, or capability of multi-panel simultaneous transmission of uplink signals.

17. A wireless communication device, comprising:

at least one processor configured to:

receive, from a network, a plurality of modes configured by the network for the wireless communication device;

determine at least one mode from the received plurality of modes, wherein each of the plurality of modes corresponds to at least one beam state;

report, to the network, that one or more of the at least one beam state are used for downlink transmission by reporting a value indicating that there is no mode for each of the one or more of the at least one beam state corresponding to the value; and determine an uplink transmission according to at least one of the at least one beam state or the at least one mode.

18. A wireless communication method, comprising:

sending, by a network to a wireless communication device, a plurality of modes, wherein each of the plurality of modes corresponds to at least one beam state;

receiving, by the network from the wireless communication device, an indication that one or more of the at least one beam state are used for downlink transmission, wherein the indication comprises a value indicating that there is no mode for each of the one or more of the at least one beam state corresponding to the value; and receiving, by the network from the wireless communication device, an uplink transmission according to the at least one mode or the at least one beam state, wherein the at least one mode is determined by the wireless communication device from the plurality of modes.

19. A network node, comprising:

at least one processor configured to:

send, via a transceiver to a wireless communication device, a plurality of modes, wherein each of the plurality of modes corresponds to at least one beam state;

receive, via the transceiver from the wireless communication device, an indication that one or more of the at least one beam state are used for downlink transmission, wherein the indication comprises a value indicating that there is no mode for each of the one or more of the at least one beam state corresponding to the value; and receive, via the transceiver from the wireless communication device, an uplink transmission according to the at least one mode or the at least one beam state, wherein the at least one mode is determined by the wireless communication device from the plurality of modes.

* * * * *